(12) United States Patent
Cripe

(10) Patent No.: US 7,350,425 B2
(45) Date of Patent: Apr. 1, 2008

(54) METHOD OF ELIMINATING HYSTERESIS FROM A MAGNETOELASTIC TORQUE SENSOR

(75) Inventor: David W. Cripe, Williamsburg, VA (US)

(73) Assignee: Continental Automotive Systems US, Inc., Auburn Hills ( * ) Notice: Subject to any disclaimer, the term of this patent is extended or adjusted under 35 U.S.C. 154(b) by 145 days.

(21) Appl. No.: 11/232,603

(22) Filed: Sep. 22, 2005

(65) Prior Publication Data

US 2007/0062312 A1   Mar. 22, 2007

(51) Int. Cl.
*G01L 3/10*   (2006.01)
*H01F 7/06*   (2006.01)

(52) U.S. Cl. ............... 73/862.333; 29/602.1; 324/253

(58) Field of Classification Search ........... 73/862.333; 29/602.1; 324/253
See application file for complete search history.

(56) References Cited

U.S. PATENT DOCUMENTS

| | | | |
|---|---|---|---|
| 5,124,648 A | 6/1992 | Webb et al. | |
| 5,351,555 A | 10/1994 | Garshelis | |
| 5,419,207 A * | 5/1995 | Kobayashi et al. | .... 73/862.333 |
| 5,696,575 A | 12/1997 | Kohnen et al. | |
| 5,889,215 A * | 3/1999 | Kilmartin et al. | ...... 73/862.335 |
| 5,939,881 A | 8/1999 | Slater et al. | |
| 6,145,387 A | 11/2000 | Garshelis | |
| 6,222,363 B1 * | 4/2001 | Cripe | .......... 324/253 |
| 6,298,467 B1 | 10/2001 | Chuang et al. | |
| 6,300,855 B1 | 10/2001 | Clark et al. | |
| 6,346,812 B1 | 2/2002 | May et al. | |
| 6,516,508 B1 | 2/2003 | Gandarillas | |
| 6,553,847 B2 | 4/2003 | Garshelis | |
| 6,698,299 B2 | 3/2004 | Cripe | |
| 6,776,057 B1 | 8/2004 | May | |
| 6,871,555 B2 | 3/2005 | May | |
| 7,180,311 B2 * | 2/2007 | Seto | ........... 324/725 |
| 2002/0162403 A1 * | 11/2002 | Cripe | .......... 73/862.333 |
| 2007/0034021 A1 * | 2/2007 | Cripe | .......... 73/862.331 |

FOREIGN PATENT DOCUMENTS

| | | |
|---|---|---|
| EP | 1752751 | 2/2007 |
| WO | 9956099 | 11/1999 |
| WO | 0223146 | 3/2002 |

\* cited by examiner

*Primary Examiner*—Edward Lefkowitz
*Assistant Examiner*—Punam Patel

(57) ABSTRACT

A method and device for reducing hysteresis in a torque transducer element includes a coil that is excited with an alternating current to produce a magnetic field that saturates the torque transducer element. Magnetic saturation of the torque transducer element is provided by an alternating frequency that exceeds any coercive force of the material. The alternating current is slowly reduced to substantially reduce undesired magnetic field. The coil assembly is excited with an amplitude frequency in such a manner as to remove only those components of the magnetic field that are not desired.

13 Claims, 4 Drawing Sheets

METHOD OF ELIMINATING HYSTERESIS FROM A MAGNETOELASTIC TORQUE SENSOR

BACKGROUND OF THE INVENTION

This invention is generally directed toward a method of eliminating hysteresis in a magnetoelastic torque sensor. More particularly, this invention is a method of removing remanent magnetism outside of a desired magnetic flux path.

A magnetoelastic torque sensor utilizes one or more bands of magnetoelastic material supported on a substrate. The magnetoelastic bands possess circumferential remanent magnetization bound by the magnetocrystalline anisotropy of the material. Torque applied to the substrate induces a helical shear stress on the magnetoelastic material that results in a shift of the path of the magnetic field from a circumferential to helical orientation. Axial components of the magnetic field are measured utilizing a magnet field measurement device and are utilized to determine torque.

Disadvantageously, once the application of torque on the substrate is discontinued, a remanent portion of the magnetic field remains. The axially-directed remanent magnetic field within the magnetoelastic band causes a shift in a zero point of the torque sensor. The shift of the zero value is commonly known as hysteresis. A known method of eliminating the magnetism within a magnetized body includes placing the structure within an alternating magnetic field with peak amplitude exceeding the coercive force of the material. However, such methods require separate devices that are not available during operation, and remove all magnetic components, even those in the desired circumferential magnetic orientation.

Accordingly, it is desirable to develop a method and device for selectively removing axial hysteretic magnetic remanents, while leaving the desirable circumferential magnetic remanences intact.

SUMMARY OF THE INVENTION

An example method according to this invention provides for the elimination of hysteresis with a torque transducer element by exerting an alternating magnetic field from a coil to remove remanent magnetization along an axis of a shaft of the torque transducer.

A method according to this invention includes supporting a coil axially about a torque transducer. The coil is excited by an alternating current of an amplitude sufficient to create an alternating magnetic field with an amplitude a substantial fraction of the coercive force of the material comprising the torque transducer. The magnetic excitation of the torque transducer provides for the elimination of remanent magnetic fields in the axial direction. By specifically and particularly aligning the coil with the magnetoelastic band of the torque transducer the remanent magnetic field in the axial direction can be removed without disturbing the desirable circumferential magnetic field that is disposed within the band of the transducer.

Accordingly, a torque sensor according to this invention includes a coil assembly that is excited by an alternating current to create a magnetic field that reduces or eliminates undesired magnetic field remanences without disturbing desirable magnetic components within the torque transducer.

These and other features of the present invention can be best understood from the following specification and drawings, the following of which is a brief description.

DETAILED DESCRIPTION OF THE PREFERRED EMBODIMENT

Figure 1:
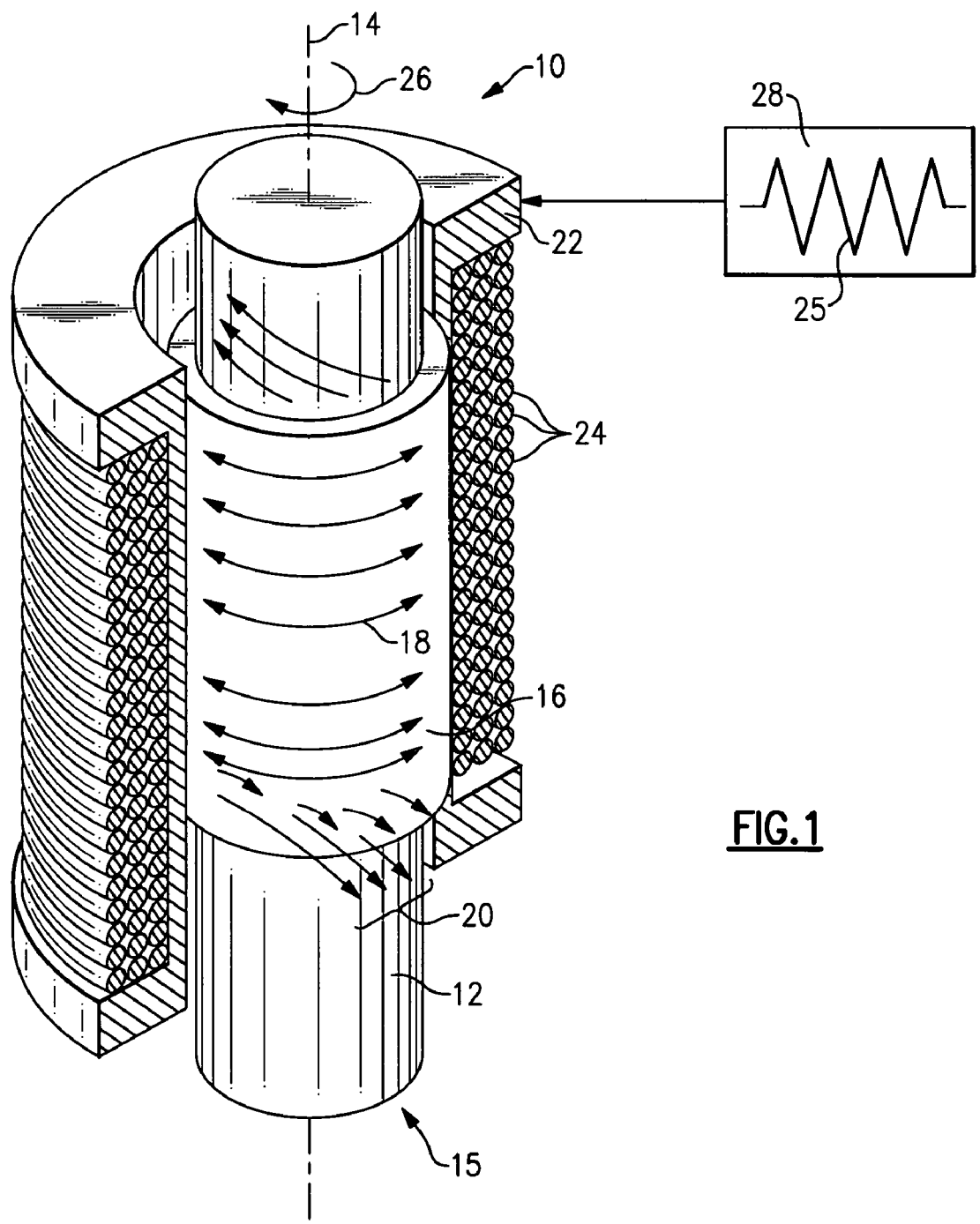
FIG. 1 is a partial cross-sectional view of an example torque transducer according to this invention.
Figure 2:
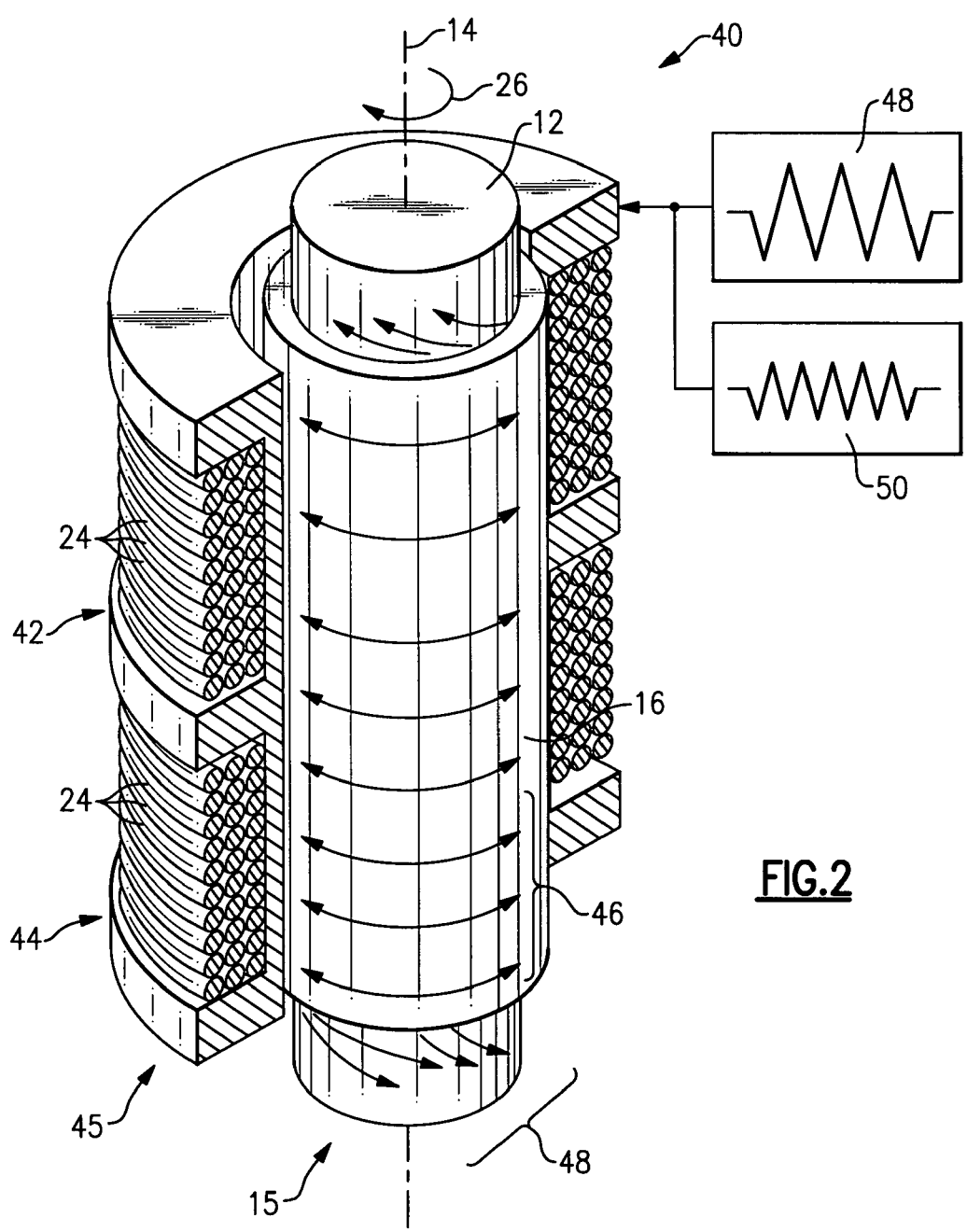
FIG. 2 is an example cross-sectional view of another torque transducer according to this invention.

Referring to FIG. 1, a portion of a torque transducer sensor assembly 10 is schematically shown. The torque sensor 10 includes a torque transducer element 15 that comprise a substrate or shaft 12 that supports a magnetoelastic ring 16. The magnetoelastic ring 16 is applied onto the shaft 12 such that torque applied as indicated at 26 to the shaft 12 is communicated to the magnetoelastic ring 16.

A circumferential magnetic field schematically shown at 18 is disposed in the magnetoelastic ring material 16. The circumferential direction of the magnetic field 18 is the neutral or non-torqued state of the torque transducer element 15. During the application of torque 26, a portion of the magnetic field 18 takes on an axial component and moves away from the circumferential direction. The axial component of the magnetic field 18 is illustrated by arrows indicated at 20. This axial component 20 of the magnetic field 18 is measured by a magnetometer coil 22. The magnetometer 22 coil is disposed relative to the transducer element 15 to detect the axial component 20 of the magnetic field 18. However, upon removal of torque applied to the shaft 12, a portion of the axial component 20 of the magnetic field 18 remains. The remaining axial component 20 of the magnetic field 18 distorts the zero position of the torque transducer element 15 resulting in an undesirable hysteresis.

Accordingly, the torque transducer assembly 10 according to this invention includes the magnetometer coil 22 with a plurality of magnet wires 24 coiled coaxially with the torque transducer element 15. The magnetometer coil 22 is connected to a power source 28 that provides an alternating current 25. The alternating current 25 excites the coil 22 to produce a magnetic field with alternating peaks. The magnitude and frequency of the alternating current 25 is selected such that it will remove the hysteretic magnetic field component 20 while leaving the circumferential component 18 intact.

The alternating current 25 is selected to comprise an amplitude and frequency determined based on the specific material utilized for the torque transducer element 15. In one example torque transducer element 15 comprised of a 9310 steel alloy, a 60-hertz frequency having fifty Oe peak fields is utilized. Such a large alternating current magnetically excites the transducer element 15 to remove axial components 20 of the magnetic field 18. Removal of the axial component 20 of the hysteretic magnetic field 18 provides for the substantial reduction of zero shift.

Once torque is released and the hysteretic axial component of the magnetic field 20 is removed, the torque sensor will operate with a substantial reduction or elimination of hysteresis and thereby provide increased accuracy.

It is appreciated that the excitation of the magnetometer coil 22 with a large alternating current 25 could potentially interfere with detection of the magnetic field 18 by the magnetic field detection device or magnetometer. However, a method according to this invention includes the alternating of current amplitudes and frequencies to provide the magnetic field detection function and also to provide the hysteretic magnetic field elimination function.

Figure 3:
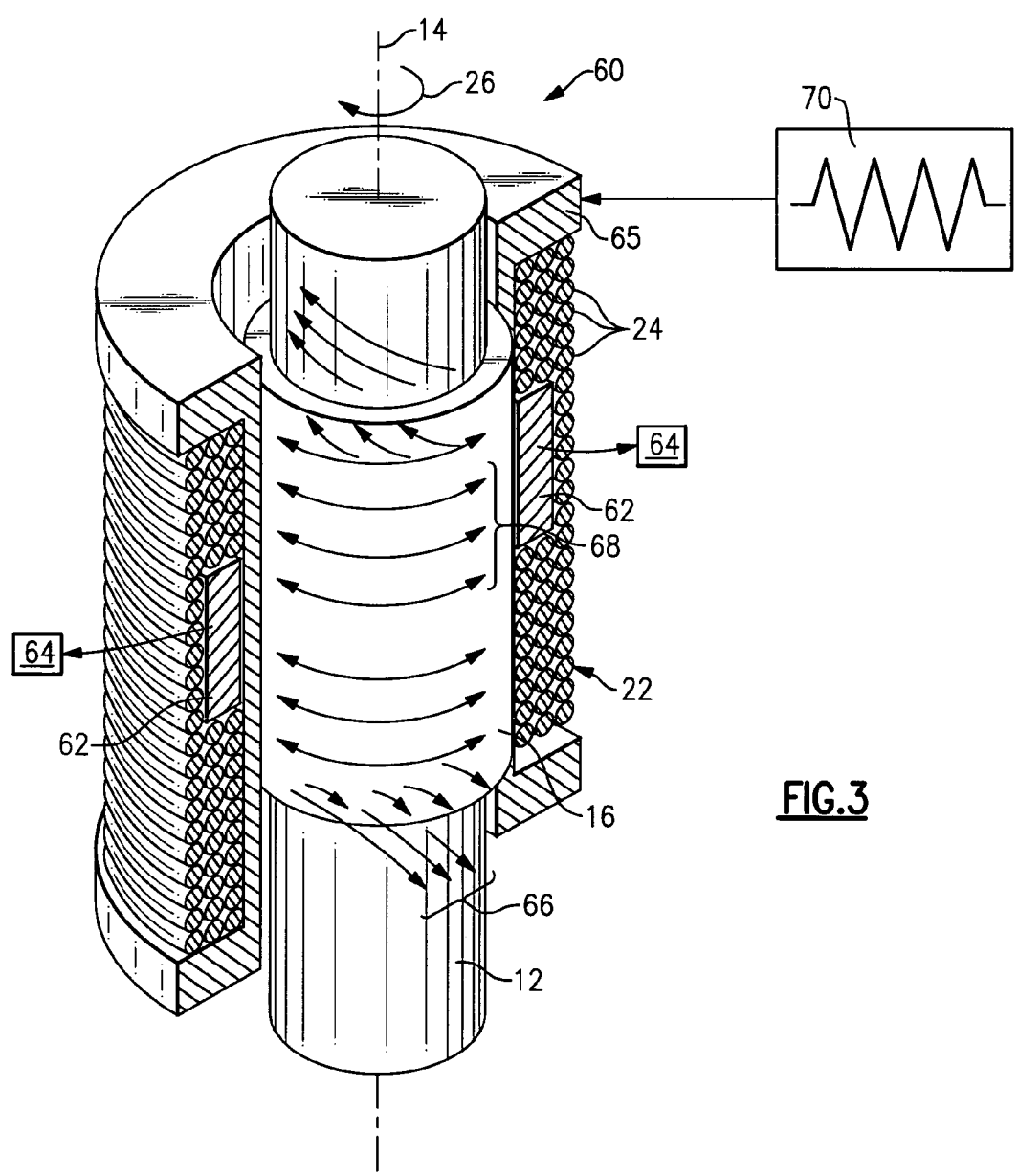
FIG. 3 is a cross-sectional view of yet another example torque sensor according to this invention.

Referring to FIG. 3, another example torque transducer is indicated at 60 and includes a coil assembly 65 that operates only as the demagnetization function to selectively remove axial hysteretic components of the magnetic field 68. Embedded within the coil assembly 65 are magnet vector detection devices 62 as are known. These magnetic vector detection devices communicate measurements of the magnetic field to control devices 64 as is known. The coil assembly 65 operates to selectively remove the axial components 66 of a magnetic field. The coil assembly 65 of the example torque sensor 60 receives an alternating current indicated at 70 to excite the coil 65 and create a periodic magnetic excitation of an amplitude and frequency determined to remove those undesirable hysteretic components of the magnetic field caused by application of torque 26.

Figure 4:
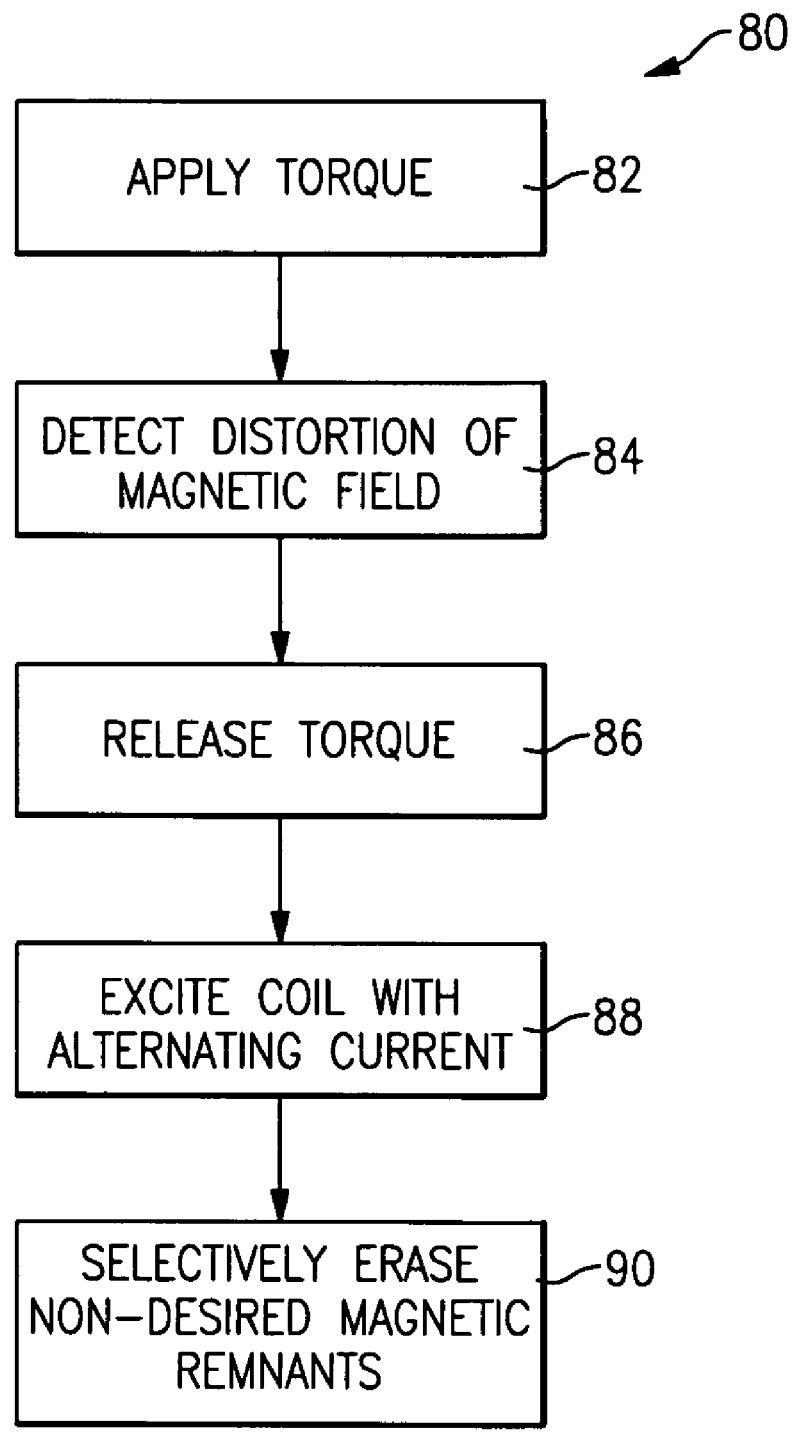
FIG. 4 is a block diagram illustrating the method step according to this invention.

Referring to FIG. 4, a method steps for removing portions of a magnetic field are indicated at 80 by a schematic block drawing. The method begins with the first application of torque to the substrate shaft 12 as indicated at 82. The distortion or torque applied to the shaft 12 causes a distortion not only in the shaft 12 but also in the magnetoelastic band 16. The distortion of the magnetoelastic band 16 is detected by a magnetic field detection device as is indicated at 84. Upon the release of torque as indicated at 86, a portion of the magnetic field that was generated by the torque will remain. The axial component of the magnetic hysteresis can cause a shift in the magnetic field read by the torque transducer element 15. This shift caused by the axial components of the hysteretic magnetic field can be eliminated to improve accuracy of the torque transducer assembly. The coil surrounding the torque transducer element 15 is excited with an alternating current as indicated at 88. The alternating current is determined to provide the required amplitude and frequency that creates an alternating magnetic field with such peak amplitude that exceeds a substantial fraction of the coercive force of a material. The amplitude of the magnetic field generated by the coil is of an amplitude sufficient to result in the saturation of the core material of the flux-gate devices 62, The saturation of these devices can be determined by coils immediately surrounding them in the conventional manner of fabrication. Asymmetry of the voltage waveform on the flux-gate coils is indicative of the presence of a magnetic field from the transducer element.

Accordingly, the method and devices according to this invention generate increased accuracy for a torque sensor by removing axial components of any magnetic fields that can cause zero shift in torque measurements.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of removing hysteretic magnetism from a magnetoelastic torque transducer comprising the steps of:
   a) supporting a coil concentrically relative to a magnetoelastic portion of the torque transducer; and
   b) exciting the coil with an alternating current of a desired frequency and amplitude to selectively erase a hysteretic magnetic field remanent including removing only axial components of the hysteretic magnetic field remanent.

2. The method as recited in claim 1, wherein the frequency and amplitude are selected to include magnetic field peak amplitude exceeding a coercive force of a material comprising the torque transducer.

3. The method as recited in claim 1, including the step of alternating operation of the coil to remove the hysteretic axial magnetic field.

4. The method as recited in claim 3, wherein the coil comprises the magnetometer and is alternately exited with a detection alternating current with a frequency and amplitude that detects distortions in the magnetic field of the torque transducer, and a removal alternating current with a frequency and amplitude that selectively removes undesired hysteretic magnetic field components.

5. The method as recited in claim 4, further comprising the steps of periodically saturating the coil to generate a distortion signal based on superimposition of an excitation field with the magnetic field generated by the torque transducer.

6. The method as recited in claim 1, including the step of detecting a magnetic field within the torque transducer with a magnetic field sensor disposed within said coil.

7. A method of removing hysteretic magnetism from a magnetoelastic torque transducer comprising the steps of:
   a) supporting a coil concentrically relative to a magnetoelastic portion of the torque transducer; and
   b) exiting the coil with an alternating current of a desired frequency and amplitude to selectively erase a hysteretic magnetic field remanent while leaving intact circumferential components of a magnetic polarization of the torque transducer.

8. A torque sensor comprising:
   a substrate that receives a torque load;
   a band of magnetoelastic material supported on said substrate and responsive to the torque load on the substrate by generating a magnetic field indicative of the torque load;
   a magnetic field sensor that measures the magnetic field;
   a coil disposed about the band of magnetoelastic material that generates an alternating magnetic field that removes only axial orientated portions of a magnetic field remaining in the band of magnetoelastic material; and
   a power source for supplying the alternating current to the coil for generating the alternating magnetic field, wherein the vower source supplies a first alternating current that generates periodic magnetic saturation in the torque sensor and a second alternating current that selectively eliminates the axially orientated portions of the magnetic field.

9. The torque sensor as recited in claim 8, wherein axial oriented portions of the magnetic field are removed after torque applied to the substrate is released.

10. The torque sensor as recited in claim 8, wherein said coil is disposed coaxially about said substrate.

11. The torque sensor as recited in claim 8, wherein the coil includes an axial length greater or equal to an axial length of the band.

12. The torque sensor as recited in claim 8, wherein the first alternating current and second alternating current are selectively applied to excite the coil.

13. The torque sensor as recited in claim 8, wherein the coil comprises a first coil and a second coil for detecting the magnetic field within the band.

* * * * *